United States Patent
VerSteeg et al.

(10) Patent No.: US 9,124,520 B2
(45) Date of Patent: Sep. 1, 2015

(54) REDUCING BUFFER BLOAT WHILE PROBING FOR ADDITIONAL BANDWIDTH IN AN ADAPTIVE BITRATE NETWORK

(71) Applicant: Cisco Technology, Inc., San Jose, CA (US)

(72) Inventors: Bill VerSteeg, Buford, GA (US); Ahmed Mansy, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 179 days.

(21) Appl. No.: 14/011,049

(22) Filed: Aug. 27, 2013

(65) Prior Publication Data

US 2015/0067137 A1    Mar. 5, 2015

(51) Int. Cl.
| | |
|---|---|
| G06F 15/16 | (2006.01) |
| H04L 12/825 | (2013.01) |
| H04L 12/26 | (2006.01) |
| H04L 12/815 | (2013.01) |
| H04L 12/24 | (2006.01) |

(52) U.S. Cl.
CPC ............. *H04L 47/25* (2013.01); *H04L 43/10* (2013.01); *H04L 47/225* (2013.01); *H04L 41/0896* (2013.01)

(58) Field of Classification Search
CPC ..... H04L 28/02; H04L 41/0896; H04L 43/10; H04L 47/225; H04L 49/9005

USPC .......................... 370/230, 233; 709/230, 231
See application file for complete search history.

(56) References Cited

U.S. PATENT DOCUMENTS

| | | | |
|---|---|---|---|
| 6,397,251 | B1 | 5/2002 | Graf |
| 2008/0192839 | A1 | 8/2008 | Gahm et al. |
| 2009/0109988 | A1 | 4/2009 | Musunuri et al. |
| 2014/0010281 | A1 | 1/2014 | Rodriguez et al. |
| 2014/0016710 | A1 | 1/2014 | Rodriguez et al. |
| 2014/0140209 | A1* | 5/2014 | Shihada et al. ............... 370/230 |
| 2014/0241152 | A1* | 8/2014 | Anthony et al. ............... 370/230 |
| 2014/0269293 | A1* | 9/2014 | Patrick et al. ................. 370/233 |
| 2014/0365677 | A1* | 12/2014 | Mueller et al. ................ 709/231 |

* cited by examiner

*Primary Examiner* — Dustin Nguyen
(74) *Attorney, Agent, or Firm* — Parker Ibrahim & Berg LLC; James M. Behmke; Stephen D. LeBarron

(57) ABSTRACT

In one embodiment, a device receives data from a network at a TCP buffer at a selected data rate, and copies the data from the TCP buffer to a decoder buffer at a reading rate. Once decreasing the reading rate to decrease a level of the decoder buffer, the device may increase the reading rate to an upshift probe rate, and monitors a TCP buffer level during reading at the upshift probe rate to determine whether the network can support the upshift probe rate. If the TCP buffer level decreases to a lower threshold during the upshift probe rate, the device returns to read data from the TCP buffer by the decoder buffer at the reading rate. If the TCP buffer level stays above the lower threshold during the upshift probe rate, the device may trigger a corresponding upshift in a send rate from a sender of the data.

20 Claims, 9 Drawing Sheets

US 9,124,520 B2

REDUCING BUFFER BLOAT WHILE PROBING FOR ADDITIONAL BANDWIDTH IN AN ADAPTIVE BITRATE NETWORK

TECHNICAL FIELD

The present disclosure relates generally to computer networks, and, more particularly, to buffer bloat in adaptive bitrate networks.

BACKGROUND

Real-time video communication applications over an Internet Protocol (IP) network, such as online video conferencing and video chatting, as well as full-length programs, are becoming widely deployed nowadays in both enterprise and consumer markets, and will become more and more popular in the foreseeable future. In those applications, the video bitstreams are generally packetized into packets using various packetization schemes that are defined under different transportation protocols. For example, while previous video streaming used protocols such as the Real Time Protocol (RTP), adaptive bitrate (ABR) streaming is a technique used in streaming multimedia over computer networks that is designed to work efficiently over large distributed hypertext transfer protocol (HTTP) networks such as the Internet.

When probing for additional bandwidth in an ABR system, the client tries to read data at a rate faster than the rate at which it is currently decoding and displaying video. It typically does this by periodically sending as fast as it can. While it is doing this, the underlying transmission control protocol (TCP) session is potentially over-driving the network and building up standing queues in the "middlebox" upstream of the bottleneck link. These enlarged queues cause delay for all packets in the same or lower priority queues. The offending flow's traffic, as well as cross traffic, is impacted by the increased delay. Many flows (such as interactive voice traffic, gaming or electronic trading) are sensitive to delay, and the user of these services can be adversely impacted by the increase in delay. This is colloquially known as "buffer bloat".

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device receives data from a network at a transmission control protocol (TCP) buffer at a selected data rate, and copies the data from the TCP buffer to a decoder buffer at a reading rate. Once decreasing the reading rate to decrease a level of the decoder buffer, the device may increase the reading rate to an upshift probe rate, and monitors a TCP buffer level while reading from the TCP buffer at the upshift probe rate to determine whether the network can support the upshift probe rate based on the TCP buffer receiving the data at an increased data rate. In response to the TCP buffer level decreasing to a lower threshold while reading from the TCP buffer at the upshift probe rate, the device returns to read data from the TCP buffer by the decoder buffer at the reading rate. However, in response to the TCP buffer level staying above the lower threshold while reading from the TCP buffer at the upshift probe rate, the device may trigger a corresponding upshift in a send rate from a sender of the data.

Description

Figure 1:
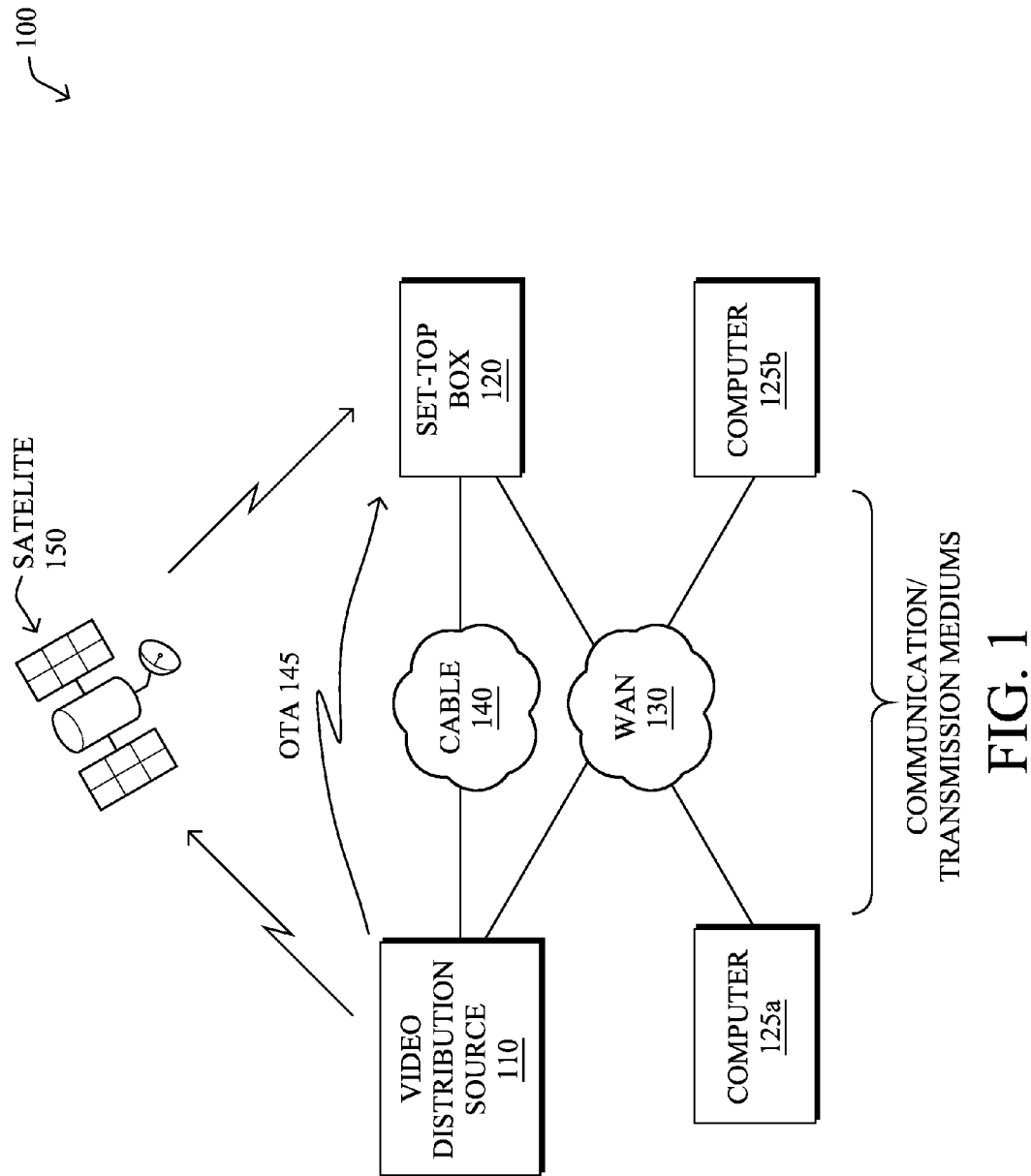
FIG. 1 illustrates an example video communication network.

FIG. 1 is a schematic block diagram of an example communication network 100 illustratively comprising nodes/devices, such as a video distribution source 110 configured to distribute video to one or more set-top boxes (STBs) 120 and/or one or more computers 125 (e.g., 125a and 125b). For instance, video may be distributed by source 110 in any number of available mediums, such as video-over-IP (Internet Protocol) via wide area network (WAN) 130, through a cable network 140, over-the-air (OTA) transmissions 145, or satellite transmission 150, etc. Also, in certain embodiments, a computer (e.g., personal computer or "PC") may distribute video over WAN 130 to other receiving devices, as will be appreciated by those skilled in the art. For example, two or more computers may participate in a video sharing application (video chat, online conferencing, etc.). Those skilled in the art will understand that any number of nodes, devices, links, etc. may be used in the communication network 100, and that the view shown herein is for simplicity.

Note that a set-top box 120 may consist of a converter box (e.g., a universal media server or "UMS" or Set Top Box "STB") used by off-air (antenna), video digital subscriber line (DSL), IP, cable, and/or satellite service providers to convert signals (from video distribution source 110) into audio and/or video (A/V) outputs for STB users, e.g., images for a television and/or monitor. Similarly, a computer 125 may also be configured to convert such signals into A/V streams for display on an associated monitor (primarily these are DSL or IP signals, though other signals may also be converted provided proper equipment and configuration).

Figure 2:
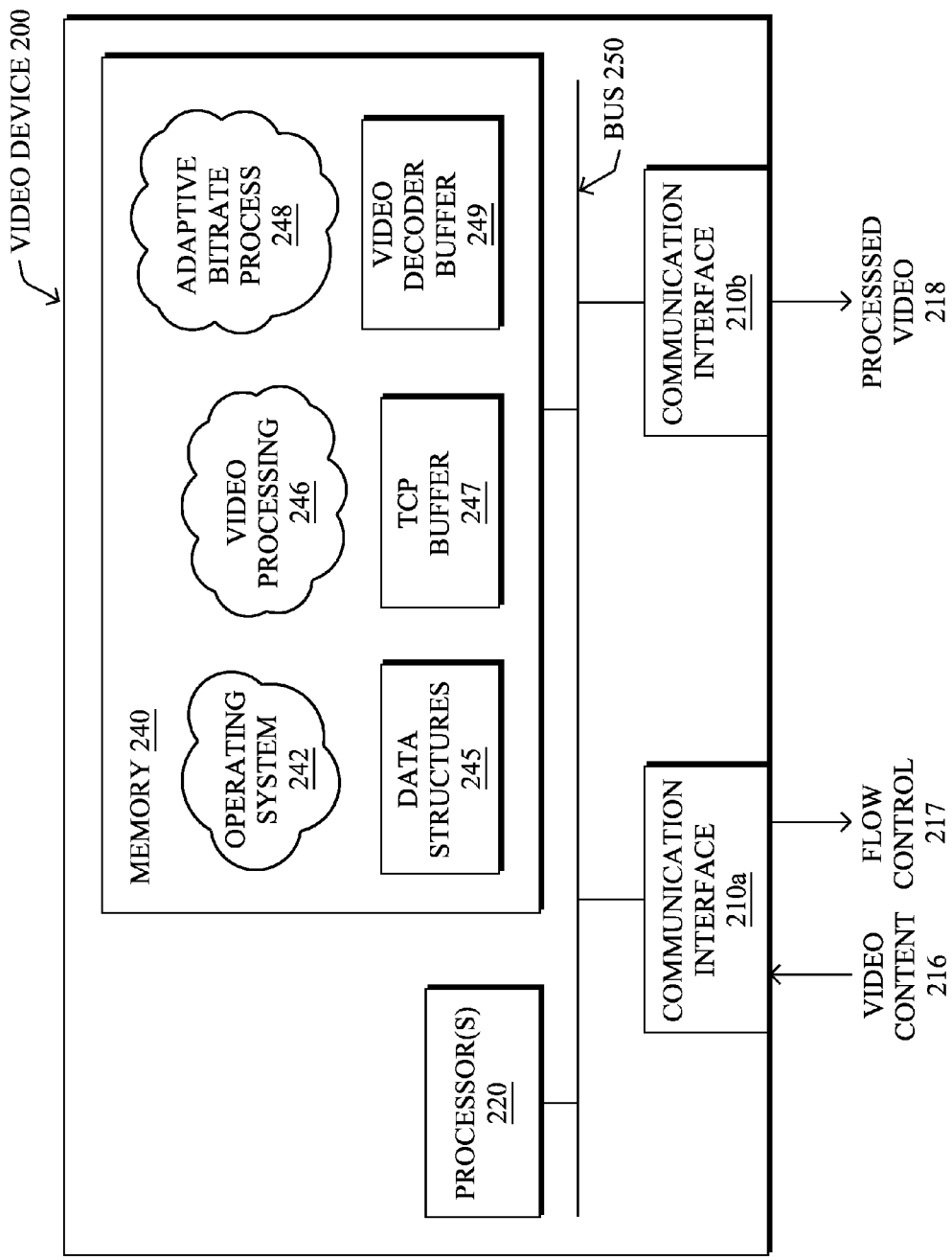
FIG. 2 illustrates an example video device/node.

FIG. 2 is a schematic block diagram of an example node/device 200 that may be used with one or more embodiments described herein, e.g., as any node/device in FIG. 1 capable of processing video as described herein, such as the video distribution receiver 120 and/or computers 125. The device may comprise one or more communication interfaces 210, at least one processor 220, and a memory 240 interconnected by a system bus 250.

The communication interface(s) 210 contain the mechanical, electrical, and signaling circuitry for communicating data (e.g., video) over various transmission mediums of the network 100. For instance, the interfaces may be configured to transmit and/or receive data using a variety of different communication protocols suitable for the transmission mediums as noted above and as will be understood by those skilled in the art. Note, further, that the device may have a first communication interface 210a, such as an Internet Protocol (IP) interface for communication over the WAN 130, and a second communication interface 210b, such as a video output interface (e.g., to a monitor or other display device).

The memory 240 comprises a plurality of storage locations that are addressable by the processor 220 for storing software programs and data structures associated with the embodiments described herein. The processor 220 may comprise necessary elements or logic adapted to execute the software programs and manipulate the data structures 245 (e.g., tables, values, etc.), such as an explicitly shown TCP buffer 247 (e.g., a "socket buffer") and decoder buffer 249 (e.g., a video "playout buffer"). (Note that while the buffers are shown in main memory 240, one or both may be configured as independent buffers within the communication interfaces, accordingly). An operating system 242, portions of which are typically resident in memory 240 and executed by the processor, functionally organizes the device by, inter alia, invoking operations in support of software processes and/or services executing on the device. These software processes and/or services may comprise an illustrative video processing process 246, and an adaptive bitrate (ABR) process 248 for use as described herein. Other processes, such as routing processes to allow communication over an IP network, are not shown for simplicity.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes may have been shown separately or in combination, those skilled in the art will appreciate that processes may be routines or modules within other processes, or else standalone processes, accordingly.

As mentioned above, real-time video communication applications over an IP network, such as online video conferencing and video chatting, are becoming widely deployed nowadays in both enterprise and consumer markets, and will become more and more popular in the foreseeable future. In those applications, the compressed video bitstreams are generally packetized into packets that are smaller than a Maximum Data Unit (MDU) of the underlying IP networks. Also, to combat the packet losses over the network, Forward Error Correction (FEC) schemes are often applied across the video data packets. The generated error correction packets help to recover the lost video data packets if the number of the lost packets is smaller than the correction capability of the FEC code applied.

Figure 3A:
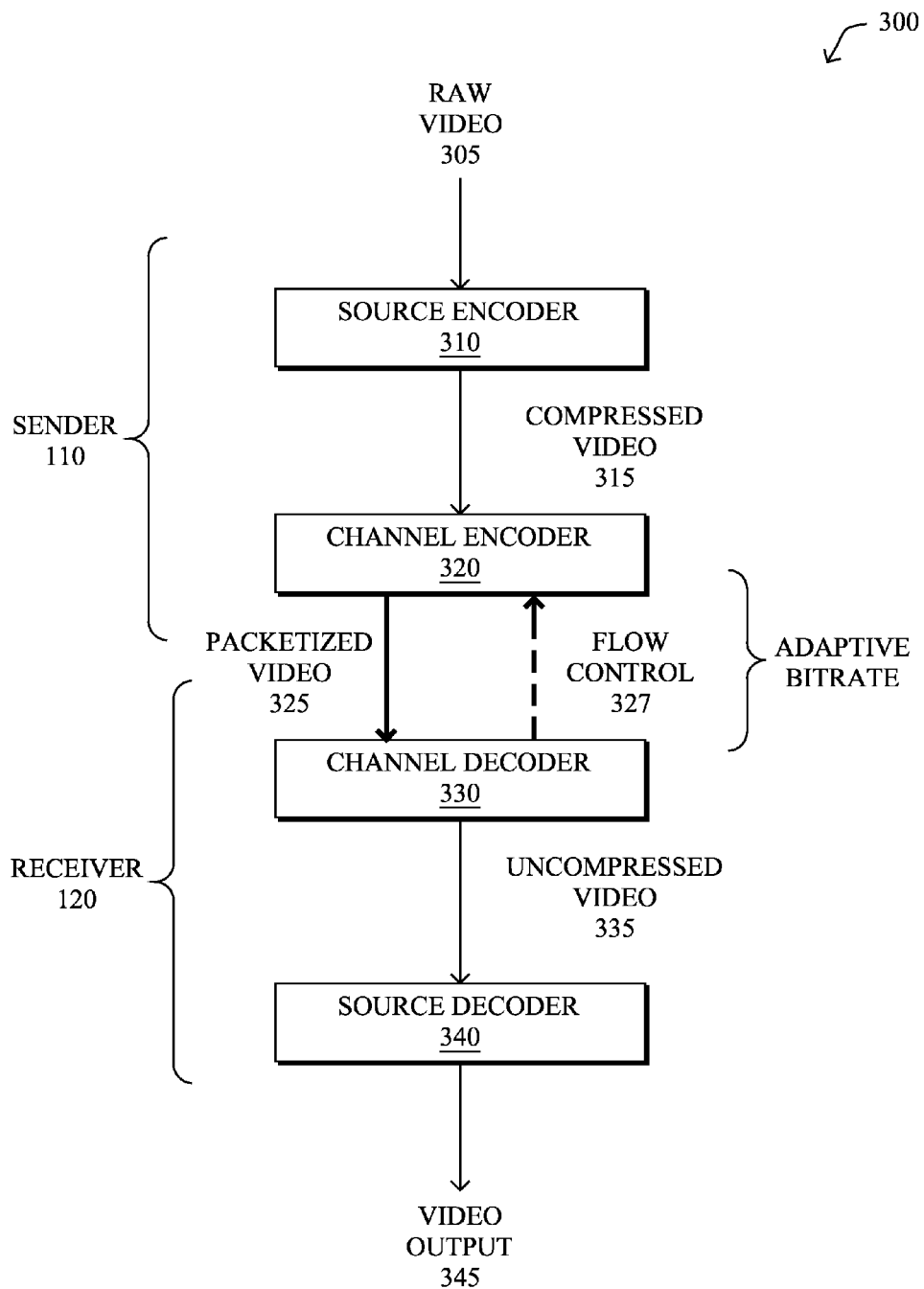
FIGS. 3A-3B illustrate examples of video communication.

FIG. 3A illustrates an example flow 300 of video as it is converted from input to output video. Specifically, at a video source/sender 110, raw video 305 may enter a source encoder 310, which processes the raw video data into compressed video data 315 (e.g., 217 of FIG. 2), or bitstream. Those skilled in the art will understand that the source encoder 310 may perform such functionality as transformation, quantization, binary encoding, etc. The compressed video data 315 is then received by a channel encoder 320, in which the packetization (e.g., and FEC processing) takes place to produce packetized video output 325 (video packets), which may be sent over a communication (e.g., IP) network. Once the packetized video is received by the receiver 120 (e.g., set-top box, PC, etc.), the channel decoder 330 decodes the packetized video, and forwards it to a source decoder 340 to produce the output video 345, accordingly. In addition, and as particularly modified by the techniques described below, the receiver 120 may provide feedback in the form of flow control messages 327 to the sender 110, such as for adaptive bitrate mechanisms.

In particular, as noted above, while previous video streaming used protocols such as the Real Time Protocol (RTP) or directly over TCP, adaptive bitrate (ABR) streaming is a technique used in streaming multimedia over computer networks that is designed to work efficiently over large distributed hypertext transfer protocol (HTTP) networks such as the Internet. In general, ABR systems work by detecting a user's bandwidth and processing capacity in real time and adjusting the quality of a video stream accordingly. It requires the use of an encoder which can encode a single source video at multiple bit rates. The player client switches between streaming the different encodings depending on available resources.

Figure 3B:
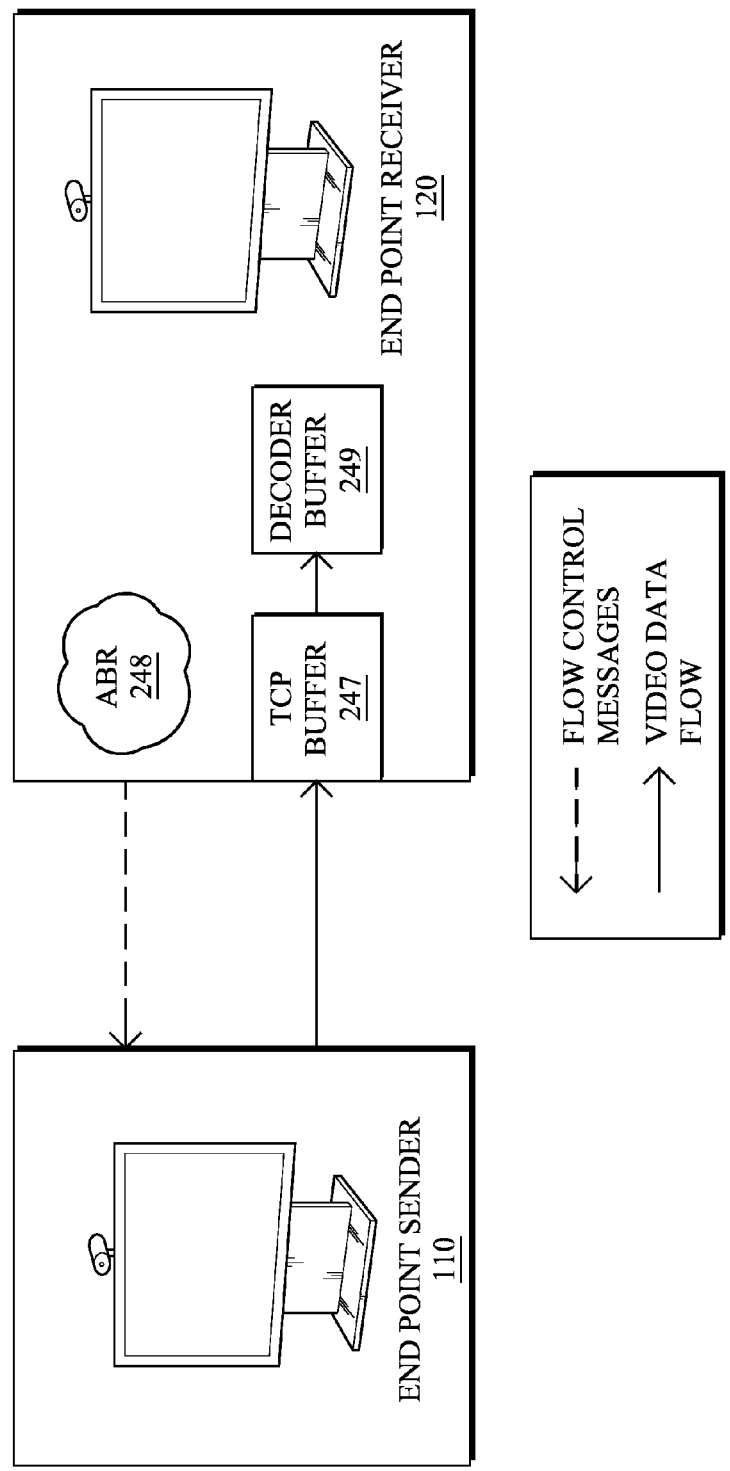

FIG. 3B illustrates a simplified view of the video flow 300 in FIG. 3A, where an endpoint video sender 110 sends a video flow to an endpoint video receiver 120, where it is received into a TCP buffer (e.g., in buffer 247) and then copied into a decoder buffer (e.g., in buffer 249). Adaptive bitrate (ABR) process 248 may then request the same video rate or a different video rate, based on the occupancy levels of the buffers.

More specifically, adaptive bitrate streaming is a method of video streaming over HTTP where the source content is encoded at multiple bit rates, then each of the different bit rate streams are segmented into small multi-second parts (e.g., a Dynamic Adaptive Streaming over HTTP (DASH) algorithm). The streaming client is made aware of the available streams at differing bit rates, and segments of the streams by a manifest file. When starting, the client requests the segments from the lowest bit rate stream. If the client finds the available download speed is greater than the bit rate of the segment downloaded, then it will request the next higher bit rate segments at the next opportunity. Later, if the client finds the download speed for a segment is lower than the bit rate for the segment, and therefore the network throughput has decreased, then it will request a lower bit rate segment. The segment size can vary depending on the particular implementation, but they are typically between two and ten seconds. The client behaves this way in order to keep the video buffer full; this is called the steady state phase. The client behavior in this phase is called the On/Off behavior, because it downloads a video segment (On) then waits for a while (Off), and so on.

As also noted above, when probing for additional bandwidth in an ABR system, the client tries to read data at a rate faster than it is currently displaying data. It typically does this by periodically requesting that the sender send data as fast as it can. While it is doing this, the underlying transmission control protocol (TCP) session is potentially over-driving the network and building up standing queues in the "middlebox" upstream of the bottleneck link. This is colloquially known as "buffer bloat", and these bloated network buffers cause delay for cross traffic. In other words, the fundamental problem is that the current ABR implementations alternate between over-driving the network and not sending any data. Note that many applications cause transient buffer bloat, but ABR systems tend to cause persistent bloat due to the periodic on-off nature of the data flows. One could carefully select a TCP buffer size and decoder buffer size that minimized the thrashing, but each buffer size would be highly dependent on local conditions and not self-tuning, i.e., the "square wave" pattern would still be present, and the network would be driven into congestion in a periodic manner.

The root cause of the buffer bloat problem is the way TCP works when driven by the legacy ABR algorithms. In order for TCP to achieve the best throughput, the sender's TCP stack tries to keep a send an amount of data approximately the size of the bandwidth delay product (BDP) of the path between the source and the destination. This means that the maximum number of bytes in flight TCP can have is equal to the BDP. In addition, TCP uses packet losses to detect congestion. When TCP detects packet loss, it realizes that the path is congested and backs off to a lower transmission rate. While it is important for TCP to detect packet loss in a timely manner, large network buffers can store a large number of packets before loss can occur and hence loss detection is significantly delayed. This causes TCP to overestimate the BDP and consequently send larger bursts of data that fill the large buffers and cause high delays.

Various techniques have been proposed to reduce the impact of buffer bloat, such as those based on middlebox techniques for buffer management (orthogonal to the techniques herein), as well as various host-based mitigations to make ABR flows more network friendly, which can be divided into two classes—server-based and client-based. The server-based mitigations revolve around limiting/shaping the flow rates to stay under a specified rate (orthogonal to the techniques herein). One client-based method for ABR is described in the paper "SABRE: A client based technique for mitigating the buffer bloat effect of adaptive video flows" written by Mansy et al., which describes how an application can control the sender's rate. The algorithm keeps some data in the TCP buffer by trying to fill the TCP buffer at a controlled rate. As long as sufficient data remains in the receiver's TCP buffer, back-pressure from the TCP session rate limits the sender via a "receiver-window" or "RWND" value.

Specifically, currently fielded Adaptive BitRate flows can be very hard on the network. They tend to send data in a cyclical square wave pattern, alternating between filling the TCP buffer at the maximum rate that the network can tolerate and not filling it at all. The TCP buffer is drained as fast as possible, filling the decoder buffer. The decoder buffer is drained at a fairly constant rate, defined by the rate at which the audio/video decoder processes the flow. This rate is known as the "natural video rate" (or "natural audio rate", or simply the "natural rate"). The square wave data flow pattern drives the network in and out of congestion, tends to build standing queues, makes bandwidth estimation difficult, and generally is a problematic. The referenced SABRE paper describes a mechanism to smooth out the flows by using RWND as the flow control mechanism to keep an ABR flow from bursting. Generally, according to SABRE (Smooth Adaptive Bit RatE), the HTTP "GETs" are pipelined so that there is always data in the pipeline, filling the buffer as fast as possible in the early stages of the playout, then reading at a rate that is approximately equal to the video playout rate. The network reading rate is varied around the natural video rate to keep the decoder buffer between a low water mark and a high water mark, where an occasional probe for an "upshift" (an increase in reading rate) is performed by increasing the network read rate to the next higher video rate (when appropriate). The decoder buffer is used to keep the decoder pipeline full of data while the network rate varies and the TCP buffer fullness varies. That is, in order to mitigate the buffer bloat problem, the SABRE algorithm enables a video client to smoothly download video segments from the server while not causing significant delays to other traffic sharing the link. The algorithm uses a technique to dynamically adjust the flow control TCP receiver-window (RWND) in a DASH client. By doing that, the burst size going from the server to the client may be controlled while effectively reducing the average queue size of the receiver (e.g., a home router). This reduction in the queue size consequently reduces the delay for all packets in the system, thus reducing the delay of cross traffic.

When an ABR client uses pipelined HTTP GETs and paced reading of the TCP buffer, the data flow is paced by the receiver's application and only has small increases in flow rate when it probes for upshifts. According to the techniques herein, therefore, these variations in data rate can be reduced by reading (and thus requesting data at the TCP layer) at a certain rate and carefully monitoring the TCP buffers on the client (i.e., detecting the receiver buffer "fullness" and using it as a trigger for initiating or aborting an ABR upshift probe). In particular, the embodiments herein fine-tune the algorithm used to probe for an upshift.

Notably, in the fielded ABR systems that do not do smooth sending, the client simply monitors the amount of time the square wave is in the transmitting state versus the amount of time it is in the idle state. Note that while in the "on" state, it is almost certainly driving the network too hard—particularly if the network has a "big buffer, tail drop" device upstream of the bottleneck link. If the network is sending data fast enough to satisfy the next higher ABR rate, the client does an upshift. When systems move to a more "network friendly" ABR algorithm that sends smoother flows, this method can no longer be used since data is no longer sent in a square wave.

Accordingly, the embodiments herein provide a technique to probe for upshifts. For instance, by remembering that the data path is always kept full by pipelining HTTP GET requests (asking for the next portion of data while there is still data in the TCP buffer from the current portion), the techniques herein probe for an upshift in the following manner. In particular, as described in greater detail below, a receiving device reads data from a TCP buffer at a selected rate and copies that data to a decoder buffer. The video decoder reads the decoder buffer at a rate (e.g., that is defined by the natural rate of the video stream. The device can monitor the TCP buffer level during steady state playout and determine if the network can support the current video rate, and down shift when appropriate. Occasionally, the device may decrease the reading rate from the TCP buffer to decrease a level of the decoder buffer in order to get some room in the decoder buffer to probe for an up shift. The device reads data from the TCP buffer at the upshift probe rate, triggering an increase in the network rate. By monitoring the TCP buffer level while draining the TCP buffer at the upshift probe rate, the device can determine if the network can support the higher rate. If the network can support the higher video rate, the device can upshift to a video asset with a higher rate at the next opportunity. The device then returns it the steady state of reading data at approximately the natural video rate, occasionally repeating the process of probing for an upshift.

Figure 4:
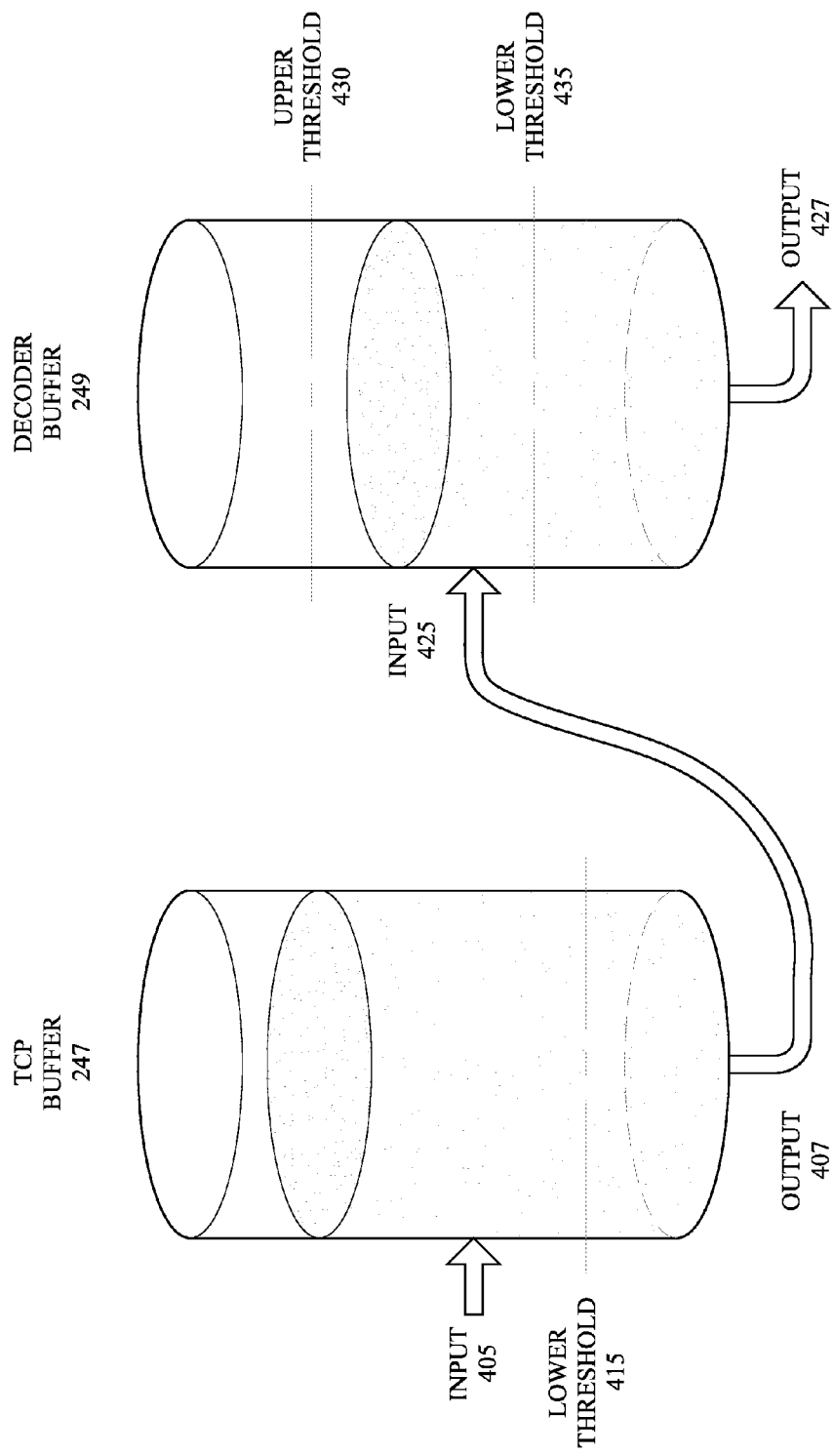
FIG. 4 illustrates an example of video buffering in accordance with one or more embodiments described herein.

FIG. 4 illustrates an example of video buffering in accordance with one or more embodiments described herein, where the TCP buffer 247 is fed input data 405 by a sender device (e.g., via WAN 130), where the level of the TCP buffer may increase or decrease based on the incoming bitrate and the rate of transfer from the TCP buffer to the decoder buffer 249 (output 407). As described herein, the fullness of this buffer is monitored to be sure data is transferred in a smooth manner, avoiding bursts. In particular, a lower threshold 415 may be used to determine that the network is not keeping up with the request rate. The fullness of this buffer is also monitored during an upshift probe as mentioned below in order to determine that the network is falling behind before the TCP buffer is drained. In particular, as described herein, if the network is not keeping up with the requested upshift, the probe can be cancelled in a timely manner, avoiding an empty TCP buffer and thus a subsequent burst.

In addition, FIG. 4 also illustrates feeding the output 407 of the TCP buffer 247 into the decoder buffer 249 (as input 425), where the level of the decoder buffer may increase or decrease based on the incoming bitrate and the rate that the decoder consumes data (i.e., the read rate or reading rate) to produce output 427. Note that the decoder consumes data at a rate that varies within a given "chunk" (a discreet portion of received data defined by data segment boundaries), but that averages out to the natural video rate over the time span of the chunk. As described herein, an upper threshold 430 may be used to determine whether to increase the video rate, while a lower threshold 435 may be used to determine whether to decrease the video rate.

Figure 5A:
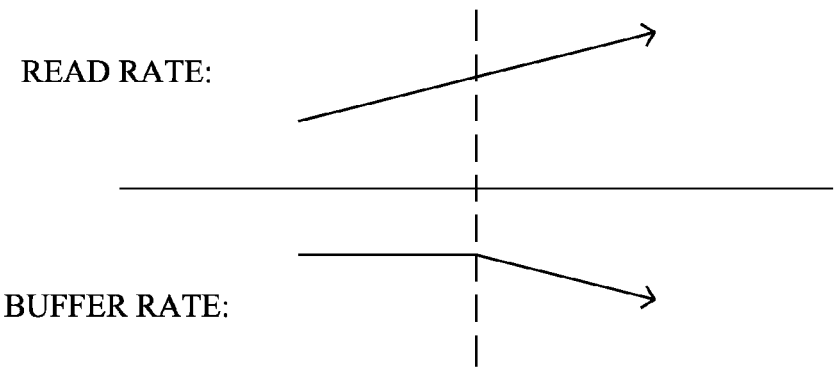
FIGS. 5A-5C illustrate examples of adaptive bitrate for buffer reads and corresponding buffer fullness.
Figure 5B:
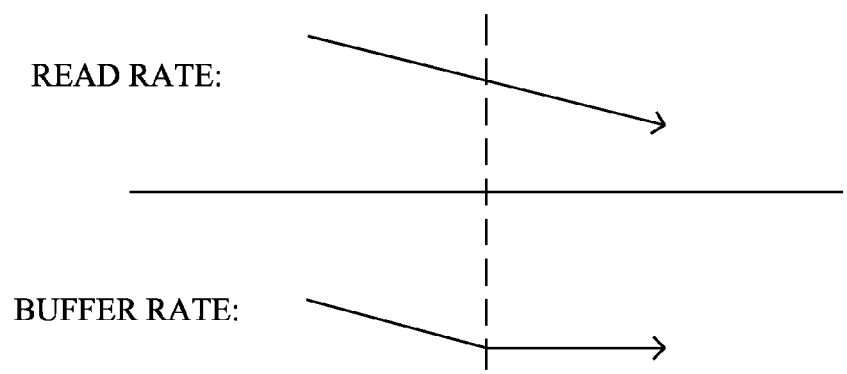
Figure 5C:
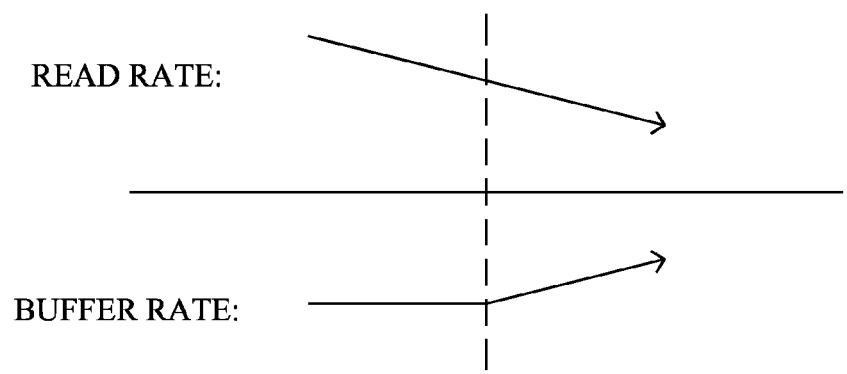

Specifically, according to the techniques herein, the receiving device may increase (ramp up) the reading rate slowly, while monitoring the amount of data that is in the TCP buffer and the decoder buffer as the consuming application reads at the higher rate. FIGS. 5A-5C illustrate examples of adaptive bitrate for buffer reads and corresponding TCP buffer fullness. As shown in FIG. 5A, so long as the TCP buffer stays full, there is more headroom to increase the reading rate. If however the TCP buffer is draining, that means that the network is not keeping up. As shown in FIG. 5B, decreasing the reading rate may eventually result in the TCP buffer level flattening out, which after continued decreasing of the reading rate in FIG. 5C, may begin to increase again. Note that it may take several round trip times (RTTs) to achieve equilibrium, so a degree of hysteresis is created through the upper and lower thresholds shown in FIG. 4.

In the event of an empty decoder buffer (substantially empty or completely empty), it can be determined that the network is being driven into congestion, and the device needs to "downshift" very soon (a decrease in reading rate). As noted, there is a low water mark in the decoder buffer (lower threshold) at which the device can start increasing the reading rate, and a high water mark (upper threshold) at which the device can start to decreasing the reading rate. Once the sustainable reading rate is known, the stable video rate can be selected. (Generally, when the buffer is between the low water and high water marks (e.g., 60% and 80%), no rate decisions need be made, and upshifting or downshifting rate decisions may be made only when outside of these boundaries.)

According to the techniques herein, occasional up shift probing may be managed in a manner that reduces buffer bloat. In particular, once a reasonably steady state is achieved at a certain video rate, where the decoder buffer is between the low water mark 435 and the high water mark 430 and the TCP buffer is also above its low water mark 415, then the techniques herein may decrease the reading rate (i.e., the transfer rate from the TCP buffer to the decoder buffer) in order to achieve some head-room in the decoder buffer. When the low water mark 435 is reached by the decoder buffer, then the reading rate is increased to the next higher video rate. Next, when the decoder buffer hits the high water mark 430, the techniques herein check to see whether the network sustained the probe rate, by looking at the TCP buffer level. If so, then the device may upshift to a higher rate at the next opportunity. Note that in either event (upshifting or not), the device attempts to resume steady state operation and reads at a rate near the natural video rate to keep the decoder buffer between the low water mark and the high water mark, accordingly, while pipelining the reads to prevent the TCP buffer from emptying.

Figure 6A:
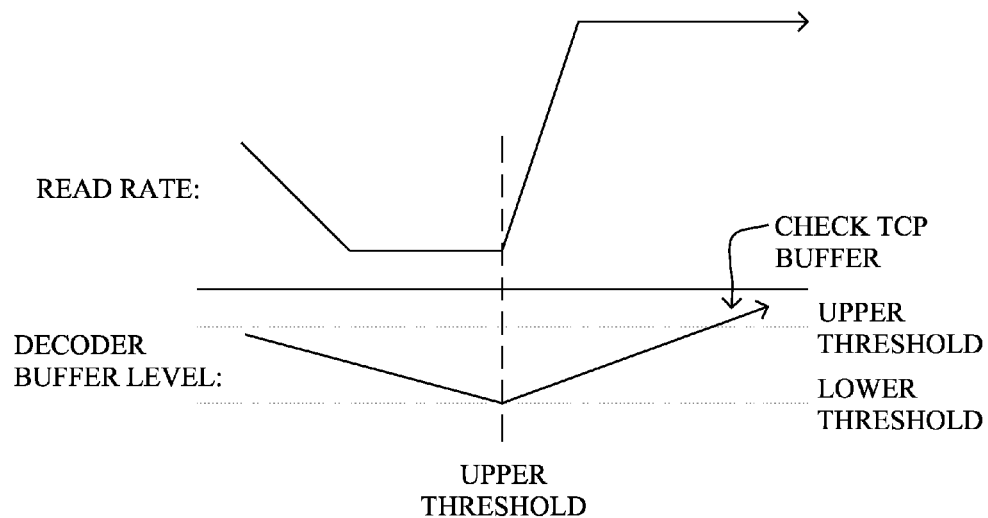
FIGS. 6A-6B illustrate examples of adaptive upshifting and downshifting of sender bitrates.
Figure 6B:
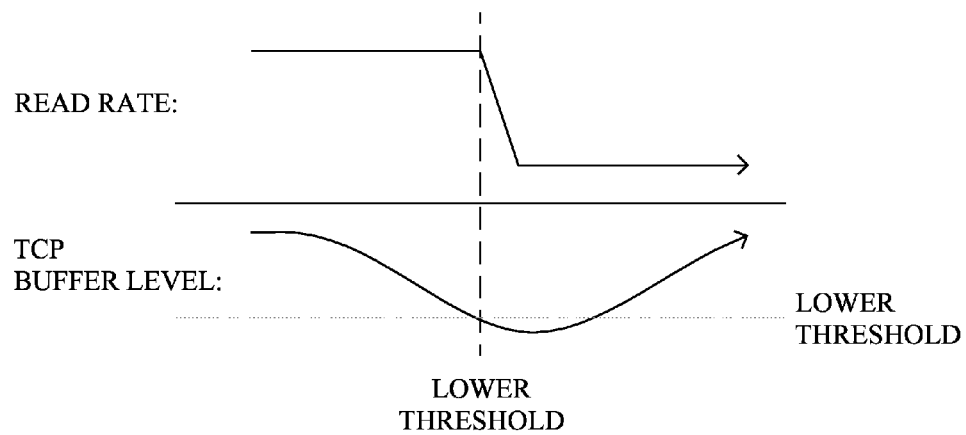

For instance, with reference to FIGS. 6A-6B, which illustrate examples of adaptive upshifting and downshifting of sender bitrates, the receiving device may occasionally decrease the reading rate (FIG. 6A) in order to drive the decoder buffer to the lower threshold, which then allows the device to increase the reading rate and probe for an upshift. The device then reads from the network faster, thus filling the decoder buffer. If the TCP buffer stays essentially full while the decoder buffer fills at the requested rate, the network can support the higher rate. If the network receive rate is not sufficient to warrant an upshift to a higher video rate, then, as shown in FIG. 6B, the device may resume reading at about the natural (e.g., previously selected/operating) rate.

Once the correct video rate is determined, the device may select that rate at the next data segment boundary. According to this technique, a reasonably precise estimation of the spare link capacity may be determined, and it can thus be used to achieve the desired video rate. In the rest of this document, this method is described as "baseline RWND pacing". This is in contrast to the "pipelined RWND pacing" described below.

Notably, when baseline RWND pacing is performed in accordance with the techniques herein, the flow bursts when the TCP buffers are drained. In particular, the TCP buffers are drained at the end of each data segment, prior to fetching the next segment, thus, when the next segment starts, the RWND would be at the maximum value and the network would see a burst. As such, in one or more embodiments herein, the GET is issued for the next data segment on the same socket when there is about one RWND remaining in the current segment. This keeps the TCP buffer partially full, and the data is paced by RWND thus desirably eliminating the OFF state and the bursts that are found in conventional techniques. In this manner, also, the pipelined read is on the same TCP session as the first read, so the data is delivered in order.

Figure 7:
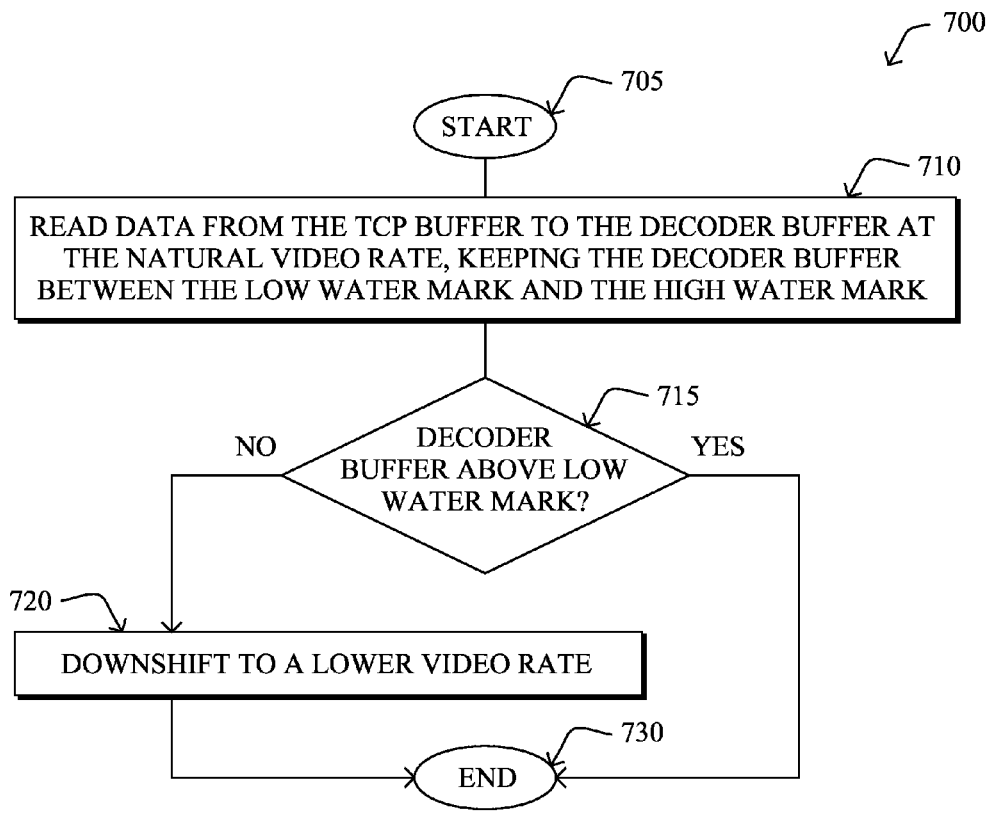
FIGS. 7-8 illustrate example simplified procedures for reducing buffer bloat while probing for additional bandwidth in an adaptive bitrate video player in accordance with one or more embodiments described herein.
Figure 8:
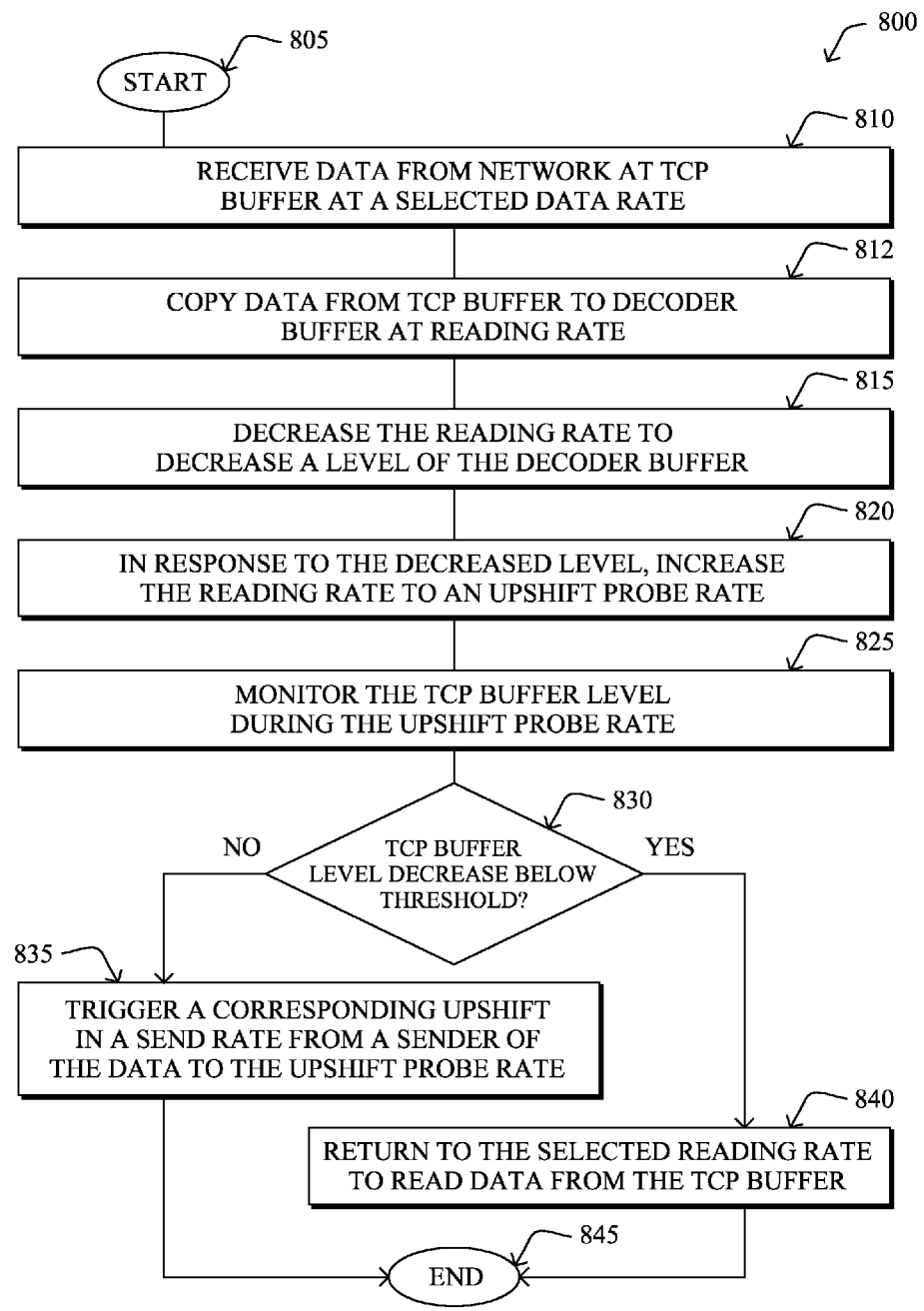

FIGS. 7-8 illustrate example simplified procedures 700-800 for reducing buffer bloat while probing for additional bandwidth in an adaptive bitrate video player in accordance with one or more embodiments described herein. Illustratively, the techniques described herein may be performed by hardware, software, and/or firmware, such as in accordance with the adaptive bitrate process 248, which may contain computer executable instructions executed by the processor 220 (or independent processor of interfaces 210) to perform functions relating to the techniques described herein, e.g., in conjunction with video processing process 246. For example, the techniques herein may be treated as extensions to conventional protocols, such as the various adaptive bitrate protocols (e.g., on host/receivers 120 in particular), and as such, may be processed by similar components understood in the art that execute those protocols, accordingly.

Generally, the algorithm has two phases. The first phase, described in FIG. 7, is to maintain the TCP buffer and the decoder buffer between the low water mark and the high water mark. The second phase, described in FIG. 8, is to occasionally probe for an upshift by first driving the decoder buffer to the low water mark and then reading data at a higher rate while monitoring the TCP buffer to see if the network can support the higher rate.

The procedure 700 of FIG. 7, particularly for setting a selected data rate, may start at step 705, and continues to step 710, where, as described in greater detail above, the device reads data from the TCP buffer 247 and copies it into the decoder buffer 249 at the same rate that the decoder buffer is being drained (aka the "natural video rate"). When the network is able to keep up with this rate, the decoder buffer level will stay approximately constant, between the low water mark 435 and the high water mark 430. In step 715, the device checks (monitors) the decoder buffer level. If the level is above the low water mark, to the procedure ends in step 730. If the level is below the low water mark in step 715, then the device downshifts to a lower video rate in step 720, and the procedure ends. Notably, though the procedure 700 is shown ending in step 730, the procedure may continue to read data from the TCP buffer at the natural video rate in step 710, and may downshift when the decoder buffer decreases below the low water mark, accordingly.

In addition, the procedure 800 of FIG. 8, particularly for probing an upshifted reading rate, may start at step 805, and continues to step 810, where, as described in greater detail above, the device receives data from a network at a TCP buffer at a selected data rate, and copies the data from the TCP buffer to a decoder buffer at a reading rate in step 812. Occasionally, in step 815, the device decreases the reading rate to decrease a level of the decoder buffer, and in response to the decreased level, increases the reading is rate to an upshift probe rate in step 820, and monitors the TCP buffer level while reading from the TCP buffer at the upshift probe rate in step 825 to determine whether the network can support the upshift probe rate based on the TCP buffer receiving the data at an increased data rate, that is, to determine whether it stays the same (above the lower threshold) or decreases (below the lower threshold), in step 830. In response to the TCP buffer level staying above the lower threshold (e.g., substantially the same) while reading from the TCP buffer at the upshift probe rate, the device may trigger a corresponding upshift in a send rate from a sender of the data to the upshift probe rate in step 835 (e.g., request a higher rate video asset at the next data segment boundary). On the other hand, in step 840, in response to the TCP buffer level decreasing to a lower threshold while reading from the TCP buffer at the upshift probe rate, the device may return to the previously selected reading rate to read data from the TCP buffer, and aborts the probe. The procedure 800 illustratively ends in step 845, notably with the option to return to step 815 to occasionally begin (retry) the upshift probe sequence.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, reduce buffer bloat while probing for additional bandwidth in an adaptive bitrate video player. In particular, ABR flows are very bursty, and these bursts can cause network anomalies, including buffer bloat. Though the pipelined GETs combined with receiver pacing via pipelined RWND smoothes out most of the spikes, there are still spikes when probing for an upshift. The techniques herein thus reduce the spikes associated with the probes. In other words, current mitigation of buffer bloat in an ABR system over-drives the network in certain conditions, and the techniques herein reduce/eliminate the amount of time that specific ABR clients over-drive the network while probing for an upshift (i.e., preventing a host's persistent burst/wait pattern).

While there have been shown and described illustrative embodiments that reduce buffer bloat while probing for additional bandwidth in an adaptive bitrate video player, it is to be understood that various other adaptations and modifications may be made within the spirit and scope of the embodiments herein. For example, the embodiments have been shown and described herein with relation to certain video-based protocols, and/or to terms currently understood by those skilled in the art. However, the embodiments in their broader sense are not as limited, and may, in fact, be used with other protocols and/or terms of art (whether currently used or defined in the future) to which the techniques herein may be suitably applied. For instance, while the novel techniques defined herein may be applied to video frames, the techniques may also be directed to other granular levels of video units (e.g., regions, macro-blocks, etc.) as may be appropriate, such as where the packetization is based on more granular video units for transmission, accordingly. In addition, while the transferred data generally has been described as video data, any data transmitted according to an adjustable bitrate may equally make use of the techniques herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
  receiving data from a network at a transmission control protocol (TCP) buffer at a selected data rate;
  copying the data from the TCP buffer to a decoder buffer at a reading rate;
  decreasing the reading rate to decrease a level of the decoder buffer;
  in response to the decreased level of the decoder buffer, increasing the reading rate to an upshift probe rate;
  monitoring a TCP buffer level while reading from the TCP buffer at the upshift probe rate to determine whether the network can support the upshift probe rate based on the TCP buffer receiving the data at an increased data rate;
  in response to the TCP buffer level decreasing to a lower threshold while reading from the TCP buffer at the upshift probe rate, returning to read data from the TCP buffer by the decoder buffer at the reading rate; and
  in response to the TCP buffer level staying above the lower threshold while reading from the TCP buffer at the upshift probe rate, triggering a corresponding upshift in a send rate from a sender of the data.

2. The method as in claim 1, further comprising:
  selecting the selected data rate by:
    monitoring the decoder buffer level while receiving data at the selected data rate; and
    in response to the decoder buffer level decreasing to a decoder buffer lower threshold while receiving data at the selected data rate, triggering a downshift in the selected read rate to a lower rate.

3. The method as in claim 1, further comprising:
  triggering the corresponding upshift at a subsequent data segment boundary.

4. The method as in claim 1, wherein monitoring the TCP buffer level comprises:
  checking the TCP buffer level in response to the level of the decoder buffer surpassing an upper threshold while reading from the TCP buffer at the upshift probe rate.

5. The method as in claim 1, wherein increasing the reading rate to the upshift probe rate is in response to the decreased level of the decoder buffer surpassing a lower threshold of the decoder buffer.

6. The method as in claim 1, wherein the data is video data.

7. The method as in claim 1, wherein the data is audio data.

8. An apparatus, comprising:
one or more network interfaces to communicate within a computer network;
a processor coupled to the network interfaces and adapted to execute one or more processes; and
a memory configured to store a process executable by the processor, the process when executed operable to:
receive data from the network at a transmission control protocol (TCP) buffer at a selected data rate;
copy the data from the TCP buffer to a decoder buffer at a reading rate;
decrease the reading rate to decrease a level of the decoder buffer;
in response to the decreased level of the decoder buffer, increase the reading rate to an upshift probe rate;
monitor a TCP buffer level while reading from the TCP buffer at the upshift probe rate to determine whether the network can support the upshift probe rate based on the TCP buffer receiving the data at an increased data rate;
in response to the TCP buffer level decreasing to a lower threshold while reading from the TCP buffer at the upshift probe rate, return to read data from the TCP buffer by the decoder buffer at the reading rate; and
in response to the TCP buffer level staying above the lower threshold while reading from the TCP buffer at the upshift probe rate, trigger a corresponding upshift in a send rate from a sender of the data.

9. The apparatus as in claim 8, wherein the process when executed is further operable to:
select the selected data rate by:
monitoring the decoder buffer level while receiving data at the selected data rate; and
in response to the decoder buffer level decreasing to a decoder buffer lower threshold while receiving data at the selected data rate, triggering a downshift in the selected read rate to a lower rate.

10. The apparatus as in claim 8, wherein the process when executed is further operable to:
trigger the corresponding upshift at a subsequent data segment boundary.

11. The apparatus as in claim 8, wherein the process when executed to monitor the TCP buffer level is operable to:
check the TCP buffer level in response to the level of the decoder buffer surpassing an upper threshold while reading from the TCP buffer at the upshift probe rate.

12. The apparatus as in claim 8, wherein increasing the reading rate to the upshift probe rate is in response to the decreased level of the decoder buffer surpassing a lower threshold of the decoder buffer.

13. The apparatus as in claim 8, wherein the data is video data.

14. The apparatus as in claim 8, wherein the data is audio data.

15. A tangible, non-transitory, computer-readable media having software encoded thereon, the software when executed by a processor operable to:
receive data from a network at a transmission control protocol (TCP) buffer at a selected data rate;
copy the data from the TCP buffer to a decoder buffer at a reading rate;
decrease the reading rate to decrease a level of the decoder buffer;
in response to the decreased level of the decoder buffer, increase the reading rate to an upshift probe rate;
monitor a TCP buffer level while reading from the TCP buffer at the upshift probe rate to determine whether the network can support the upshift probe rate based on the TCP buffer receiving the data at an increased data rate;
in response to the TCP buffer level decreasing to a lower threshold while reading from the TCP buffer at the upshift probe rate, return to read data from the TCP buffer by the decoder buffer at the reading rate; and
in response to the TCP buffer level staying above the lower threshold while reading from the TCP buffer at the upshift probe rate, trigger a corresponding upshift in a send rate from a sender of the data.

16. The computer-readable media as in claim 15, wherein the software when executed is further operable to:
select the selected data rate by:
monitoring the decoder buffer level while receiving data at the selected data rate; and
in response to the decoder buffer level decreasing to a decoder buffer lower threshold while receiving data at the selected data rate, triggering a downshift in the selected read rate to a lower rate.

17. The computer-readable media as in claim 15, wherein the software when executed is further operable to:
trigger the corresponding upshift at a subsequent data segment boundary.

18. The computer-readable media as in claim 15, wherein the software when executed to monitor the TCP buffer level is operable to:
check the TCP buffer level in response to the level of the decoder buffer surpassing an upper threshold while reading from the TCP buffer at the upshift probe rate.

19. The computer-readable media as in claim 15, wherein increasing the reading rate to the upshift probe rate is in response to the decreased level of the decoder buffer surpassing a lower threshold of the decoder buffer.

20. The computer-readable media as in claim 15, wherein the data is one of either video data or audio data.

* * * * *

UNITED STATES PATENT AND TRADEMARK OFFICE
CERTIFICATE OF CORRECTION

PATENT NO. : 9,124,520 B2  
APPLICATION NO. : 14/011049  
DATED : September 1, 2015  
INVENTOR(S) : VerSteeg et al.

Page 1 of 1

It is certified that error appears in the above-identified patent and that said Letters Patent is hereby corrected as shown below:

In the Specification

In column 9, line 14, please amend as follows:
decreased level, increases the reading [[is]] rate to an upshift

Signed and Sealed this
Nineteenth Day of January, 2016

Michelle K. Lee
*Director of the United States Patent and Trademark Office*